J. B. TURNEY.
Machine for whipping off & Catching Potato Bugs
116894  PATENTED JUL 11 1871
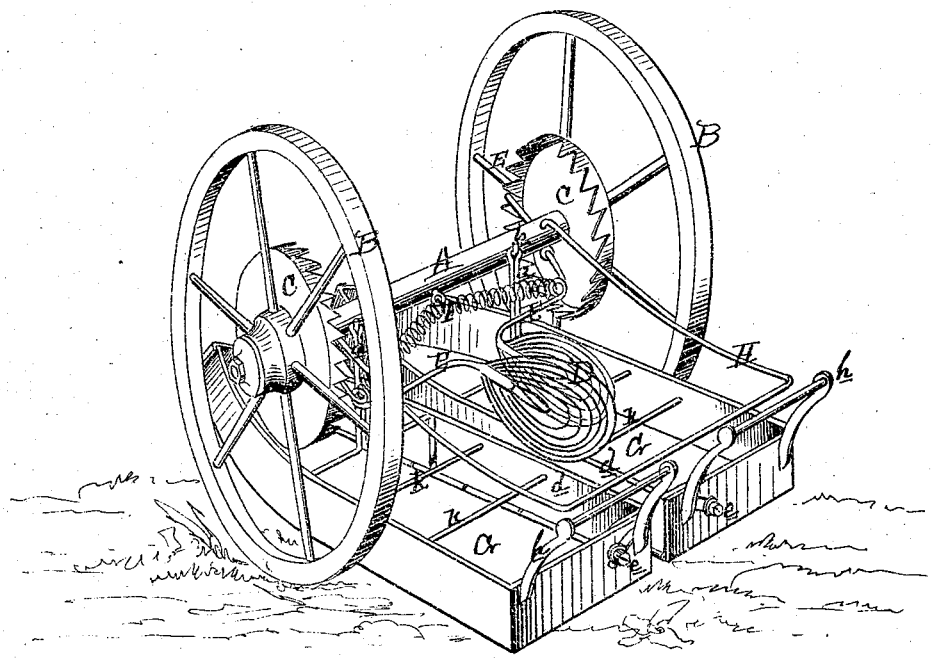
ATTEST
Frank Dunlop
Myron H. Church
INVENTOR
J. B. Turney
per atty
Thos. S. Sprague

UNITED STATES PATENT OFFICE.

JOHN B. TURNEY, OF INKSTER, MICHIGAN.

IMPROVEMENT IN POTATO-BUG DESTROYERS.

Specification forming part of Letters Patent No. 116,894, dated July 11, 1871.

*To all whom it may concern:*

Be it known that I, JOHN B. TURNEY, of Inkster, in the county of Wayne and State of Michigan, have invented a new and useful Improvement in Machine for Whipping off and Catching Potato-Bugs; and I do declare that the following is a true and accurate description thereof, reference being had to the accompanying drawing and to the letters of reference marked thereon, and being a part of this specification, in which my invention is shown in perspective.

The nature of this invention relates to the construction and operation of a machine to be driven astride of rows of potato-vines for the purpose of whipping potato-bugs off from said vines and catching them in receptacles suitably arranged for the purpose, whence they may be removed and destroyed. The invention consists in so arranging suitable mechanism that it will, when propelled astride of or in close proximity to the potato-vines, whip or smartly agitate the same without injury thereto, and compel the potato-bugs with which the vines may be infested to loosen their hold and fall into suitable receptacles; also, in the peculiar construction of the pans; and in the arrangement of the various parts, as more fully hereinafter described.

This or similar devices are designed to be employed before the insect arrives at maturity, at which time their wings appear and their ravages stop. Previous to arriving at this state their only means of locomotion is by crawling, their movements very slow, and their powers of destruction enormous. Consequently, to destroy them, they must be taken before they are matured enough to fly and deposit their eggs for the propagation of future generations.

In the accompanying drawing, A represents an axle, upon which rotate the traction-wheels B, which have secured upon their inner sides the ratchet-wheels C. D are suitable whips or brushes, made preferably of wire, secured to arms E, which are pivoted to the under side of the axle in such a manner that the ends of the arms which project beyond the axle and to the front will engage with ratchet-teeth of the wheels C, and receive therefrom, and in the rotation of said wheels, a rapid vibrating motion, which is assisted by the springs F, the inner ends of which are secured to the axle, while their outer ends are secured to the arms of the whips. The device, being propelled astride the rows of potato-vines, will whip and agitate them without injury thereto, thereby knocking off the bugs. G are pans or receptacles suspended from the axle by hangers $a$ engaging with hooks $b$ upon the axle. These pans are made preferably of the form shown, with sides so arranged that they have an inward and upward slope from the bottom to prevent the insects from crawling out, as they cannot crawl up a smooth and steeply-inclined plane. The inner sides $d$ of these pans are hinged to the bottom and so arranged, by means of the set-screws $c$ in the rear ends of the pans, that the inclination of the said inner sides may be varied as desired, or as may be necessary to accommodate the thickness of the vines. The rear ends of the pans are provided with handles $h$, and the pans are so hung that, when the device is propelled astride the vines, one of said pans, as well as one of the whips, will be on each side of the row, the whips compelling the bugs to fall into the pans. Cross-bars $k$, extending laterally across the pans, will prevent any bugs from being drawn out of them by trailing vines. A bail, H, is rigidly secured to the axle, and by elevating or depressing said bail the whips operate against the vines, higher or lower, as may be desired.

The bugs having been caught as above described, the pans are detached from the axle and their contents emptied into fire or liquid for the purpose of destroying the bugs.

What I claim as my invention, and desire to secure by Letters Patent, is—

1. In a machine for catching potato-bugs, the whips D, constructed, arranged, and operated substantially as described and shown.

2. The arrangement of the axle A, wheels B, ratchet-wheels C, whips D, arms E, springs F, and pans G, all constructed substantially as described, and combined to operate as and for the purposes set forth.

JOHN B. TURNEY.

Witnesses:
THOS. S. SPRAGUE,
MYRON H. CHURCH.